United States Patent [19]
Ross

[11] 3,735,398
[45] May 22, 1973

[54] BASE BAND SHORT RANGE PRE-COLLISION SENSOR FOR ACTUATION OF VEHICLE SAFETY APPARATUS

[75] Inventor: Gerald F. Ross, Lexington, Mass.

[73] Assignee: Sperry Rand Corporation, New York, N.Y.

[22] Filed: May 20, 1971

[21] Appl. No.: 145,154

[52] U.S. Cl. ............343/7 ED, 180/98, 280/150 AB, 246/30
[51] Int. Cl..................................................G01s 9/04
[58] Field of Search......................343/112 CA, 7 ED; 246/30, 182 B; 180/98; 280/150 AB

[56] References Cited
UNITED STATES PATENTS 3,377,587  4/1968  Nakahara et al....................343/7 ED
3,420,572  1/1969  Bisland..............................343/7 ED Primary Examiner—Gerald M. Forlenza
Assistant Examiner—George H. Libman
Attorney—S. C. Yeaton

[57] ABSTRACT

A vehicle safety apparatus includes a radio means for the detection of an impending collision immediately prior to contact of the vehicle with another object and for actuation of restraining or other safety devices for protecting occupants of the vehicle when the crash event actually occurs. Base-band radio pulse transmission and reception devices with first and second echo signal range gating channels provide distinctive output signals at first and second distances between the vehicle and the reflecting object which signals, when present simultaneously with an absolute forward vehicle speed signal of appropriate value, cause actuation of the protective devices.

23 Claims, 15 Drawing Figures

INVENTOR
GERALD F. ROSS
BY
*HP Terry*
ATTORNEY

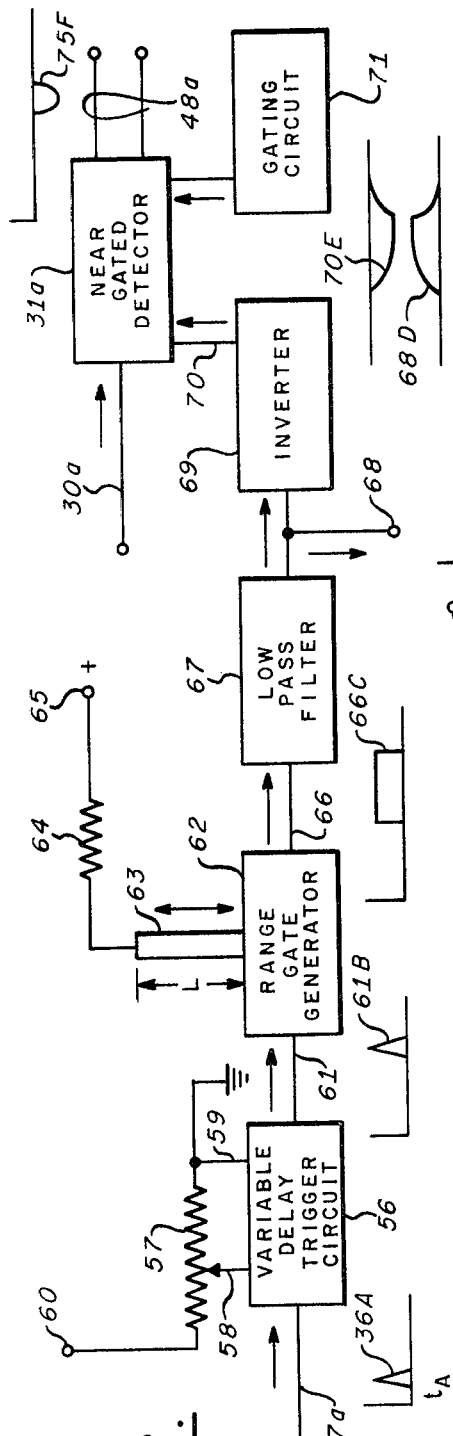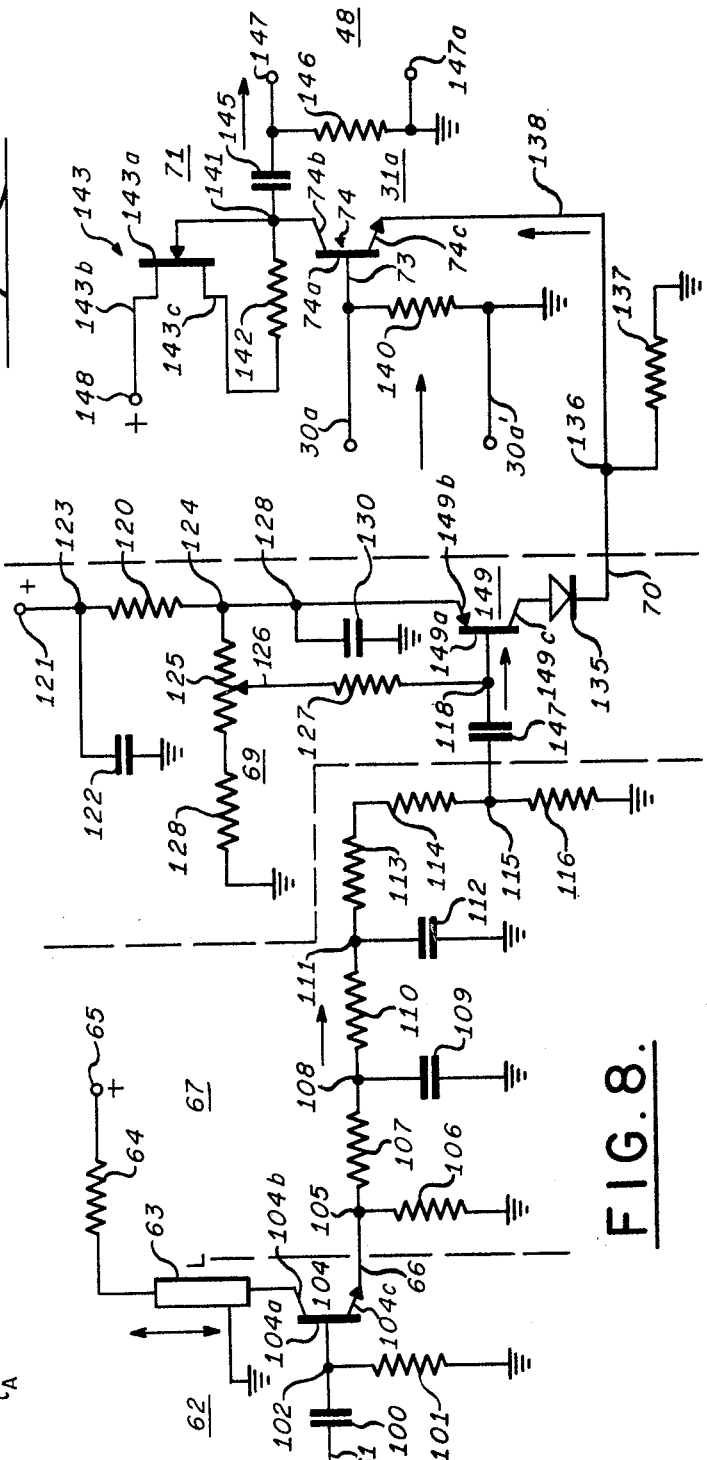

INVENTOR
GERALD F. ROSS
BY
*H P Terry*
ATTORNEY

INVENTOR
GERALD F. ROSS

INVENTOR
GERALD F. ROSS
BY
*H P Terry*
ATTORNEY

BASE BAND SHORT RANGE PRE-COLLISION SENSOR FOR ACTUATION OF VEHICLE SAFETY APPARATUS

BACKGROUND OF THE INVENTION

1. Field of the Invention

The invention pertains to safety apparatus for the detection of an impending vehicular collision and for the automatic operation of protective devices and more particularly concerns means for utilizing successively reflected base-band or short duration radio signals for the generation of distinct control signals according to the presence and relative speed of the reflecting object and the absolute forward speed of the protected vehicle.

2. Description of the Prior Art

In the prior art, both pulse and continuous wave types of radio object detection systems have been considered as sensors for warning of the potentiality of vehicle collisions or for operating certain devices tending to diminish the potential of vehicular collisions, such as between a following car and an automobile in front of it. As to such systems proposing the use of pulse transmissions, relatively high power is radiated and the use of a wide portion of the electromagnetic spectrum is demanded, thus rendering a considerable part of the high frequency spectrum useless for communication or other desirable purposes. Such prior art systems also block cooperative or other receivers for a considerable time, thus rendering them useless for sensing obstacles at near ranges. Continuous wave systems have been suggested for the collision avoidance or detection function; but they, too, have many of the disadvantages of pulse systems in short range measurement, as well as having cyclic range ambiguity characteristics. Accordingly, there is not known in the prior art a radio frequency collision detector or sensor system which may be operated with full success over nearby object distances in a wave band already allotted to conventional receivers in the same geographical vicinity. More particularly, there is not known in the prior art a radio frequency collision detector or sensor system of the just described type which can operate at very low or legal power levels in such wave bands without itself being the victim of intolerable interference. Furthermore, there is not known in the prior art a radio frequency collision detector or sensor system such as described in the foregoing and also capable of transmission and reception of signals having an extremely wide frequency spectrum without interfering with the transmission of ordinary radio communication signals.

In consequence of these and other serious deficiencies of the prior art, those seeking to devise means for protecting vehicle passengers in actual collisions between vehicles or between a vehicle and another object have sought to use crude mechanical sensors in the form of decelerometer-like devices which in theory operate only after the collision impact occurs; i.e., they are not capable of anticipating the crash event. For example, one such mechanical sensor device includes a mass which is biased to an inactive position against a stop by plural spring contact members. During an actual collision, the mass is designed to move, overcoming the spring bias and activating a safety device such as a passenger restraining gas bag. Because such sensors lack the capability of anticipating a crash event, they are actuated, where they do perform reliably, always after the passenger's body has started to move toward the vehicle dash board; i.e., the passenger is struck by the gas bag moving toward him relatively faster than the dash board of the vehicle.

In this and in similar mechanical sensors which have been proposed for safety device actuation, the apparatus is presumed to be always in condition to operate satisfactorily, while in fact it may have remained in a dormant, untended and untested condition for months or even years. Fail-safe and operability monitoring instrumentalities are not present, and more important, are generally incapable of application to such devices, since such decelerometer devices are designed as strictly one-shot mechanical devices and do not readily accommodate themselves by nature to testing. While these prior art deceleration sensing devices are theoretically devised to be actuated at a particular impact level, there is little hope that they can demonstrate accurately repeatable characteristics in actual practice.

SUMMARY OF THE INVENTION

The present invention relates to vehicular safety systems that include radio means for the detection of a potential collision of a protected vehicle with another vehicle or other object immediately prior to impact and for actuation of restraining or other safety devices also just prior to the collision for the protection of occupants of the vehicle before the crash event actually occurs. The radio sensor employs base-band or very short duration electromagnetic pulse transmission and reception devices with range gating arrangements adapted to sense relative speeds of the vehicles involved in the potential crash. These signals, along with a signal representing absolute speed of the protected vehicle, are employed when simultaneously present to activate passenger restraining or other protective devices in anticipation of the actual collision event. The radio object or collision sensor system is so constructed and arranged as to afford sensing of near range vehicles or other objects without interference with the operation of conventional radio communication systems and, in turn, without being substantially affected in normal operation by the radiations of other radio frequency systems or by ambient electrical noise signals.

The collision sensor transmitter appropriate for employment in the novel collision sensor system utilizes a non-dispersive transmission line system for generation of base-band or subnanosecond pulses of electromagnetic energy and for their radiation into space, cyclic energy storage on the transmission line and alternate cyclic energy radiation therefrom being employed. The transmission line functions as a non-dispersive radiator, launching the subnanosecond impulses into space with substantially no distortion. Such base-band pulses have an extremely wide energy spectrum; while the total energy content of any given transmitted base-band pulse may be considerable, the few spectral lines falling within the relatively narrow pass band of a conventional receiver are of low amplitude and have no effect thereon.

The radio object or collision sensor receiver suitable for detecting and utilizing such short base-band electromagnetic pulses also employs a dispersionless transmission line antenna, with a utilization circuit cooperating with a gated semiconductor detector element located within the antenna transmission line for instantaneously detecting substantially the total energy of the base-band pulse and for supplying a corresponding output suitable for processing in short range detection circuits. The receiver antenna system supplies substantially the total energy of each undistorted received base-band pulse directly to the gated receiver detector; thus, the receiver is adapted to operate successfully with pulse signals having a very wide spectral extent. Further, the receiver may operate with base-band pulse signals having spectral components each of such low individual energy content as to escape detection by conventional relatively narrow band receivers. The total energy in each base-band pulse can, however, be relatively larger than the level of noise or other interfering pulses or signals in the vicinity of the novel receiver. Thus, by appropriately adjusting the output level of the collision sensor transmitter and the sensitivity or threshold of the collision sensor receiver, base-band signals not affecting other receivers are readily transmitted, received, and detected without the collision sensor receiver, in turn, being affected in any substantial degree by other radio energy transmissions. The major processing of the echo signals is accomplished, according to the invention, by simple base-band signal processing circuits, thus avoiding the need for signal frequency conversion and the problems associated with alignment and operation of conventional radio and intermediate frequency amplifiers.

The novel base-band collision sensor system operates with very low energy consumption, so that power supply cost and size are minimized. Furthermore, with such low power operation, inexpensive components find long life use throughout the transmitter. The receiver and signal processor circuits are similarly categorized, all elements being of very simple nature and otherwise inexpensive of installation, maintenance, and operation, adapting readily to cooperative use with conventional processing and control equipment.

BRIEF DESCRIPTION OF THE DRAWINGS

FIG. 7 is a block diagram of the range gating apparatus of FIG. 1.

FIG. 8 is a circuit diagram showing details of a portion of the apparatus of FIG. 7.

DESCRIPTION OF THE PREFERRED EMBODIMENT

Figure 1:
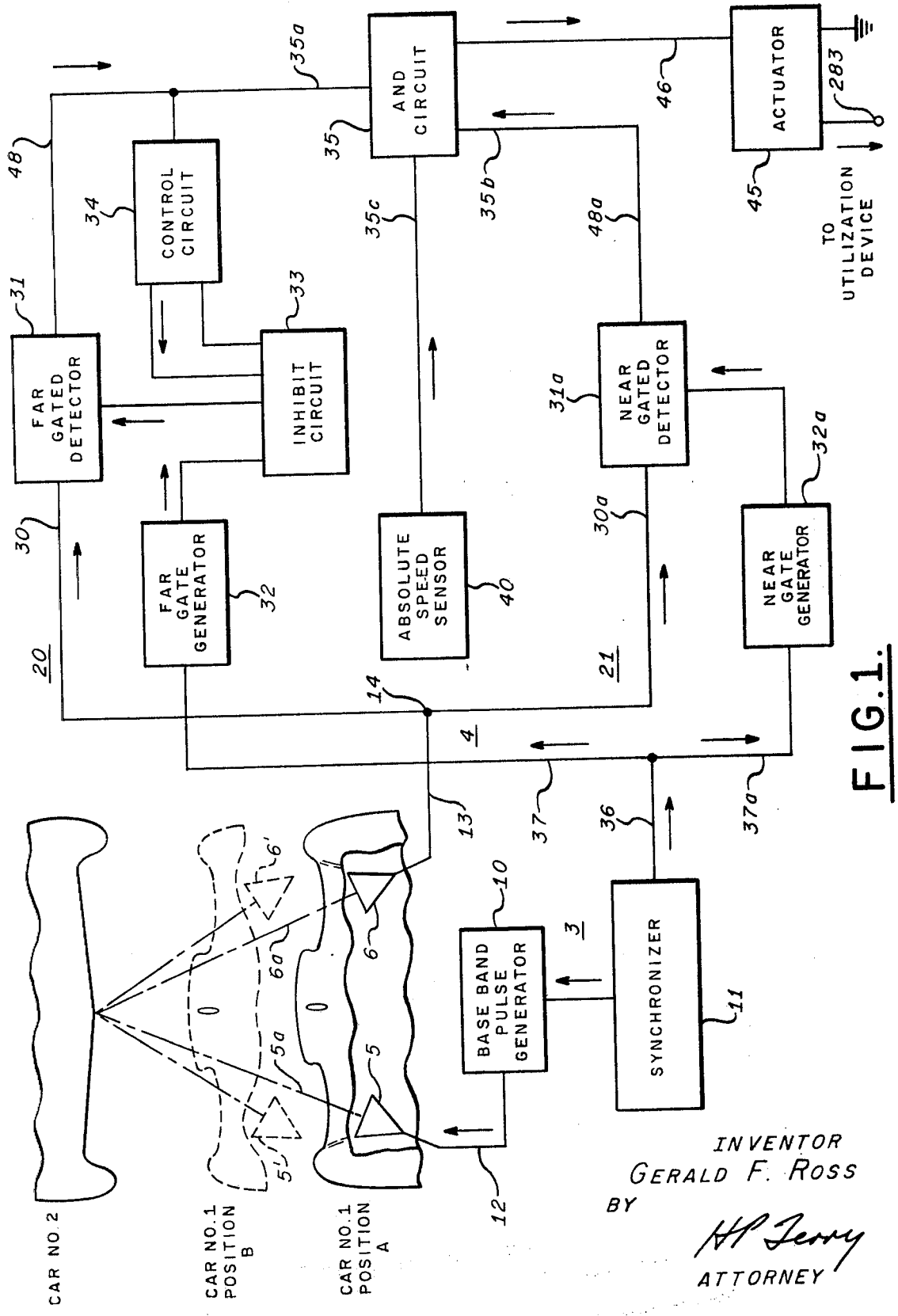
FIG. 1 is a diagram of a preferred embodiment of the invention showing components thereof and their electrical interconnections.

FIG. 1 illustrates the front of a vehicle or car 1 in successive positions A and B with respect to the rear of a second vehicle or car 2. It will be understood that both cars 1 and 2 may be moving, and otherwise that relative motion between the two cars may cause car 1 to move from position A to a position such as position B, thus decreasing the distance between the two vehicles. Should the relative speeds differ and that difference be maintained, a contact between the two vehicles is inevitable. If the maintained relative speed is above a nominal value, collision damage to the cars and their occupants is a probable consequence. It will be recognized that car 2 may be a stationary vehicle or may be a normally stationary object such as a metal highway barrier or wall.

According to the invention, impending collisions of the above kind with vehicles or other objects are detected for the purpose of operating safety devices of well known types for the reduction of damage to one or both vehicles and of injuries to vehicle occupants. For this purpose, there is provided within car 1 a base-band pulse transmitter 3 and a cooperating echo reception and detector system 4 of the type adapted to operate using subnanosecond duration pulses of electromagnetic energy. A transmitter antenna 5 may be located at the left side of car 1 behind a dielectric grill at the front of the car, with a radiation pattern directed in a generally forward manner toward any obstacle to forward motion of car 1 that might be present, such as car 2. A receiver antenna 6 is similarly mounted at the right side of car 1 behind the dielectric grill, being directed so that its receptivity pattern is arranged to collect signals reflected from an obstacle, such as car 2. It will be apparent to those skilled in the art that the dash-dot lines 5a and 6a are intended in a general way to represent paths taken by radiation transmitted by antenna 5, reflected at a representative reflecting point on car 2, and received by receiver antenna 6. Antennas 5 and 6 preferably have respective radiation and receptivity patterns sufficiently wide for echo energy to be collected generally from the rear or other part of car 2.

The transmitter system 3 utilizes a short base-band transmitter or pulse generator 10 and the directive radiator antenna 5, the transmitter pulse generator 10 being connected to radiator or antenna 5 through an interconnecting transmission line system 12. Generator 10 may be of the self-synchronizing kind and may be of a generally conventional type. For example, there is known in the art a variety of transmitter systems for producing single positive or negative going pulses or regular or other trains of pulses, each such pulse having a very short duration, and for radiating such pulses from a suitable antenna 5. Rotary and other spark gap transmitters, for instance, readily produce short electromagnetic pulses. Delay line pulse generators are well understood in the art to be capable of adjustment such that very short electromagnetic pulses may be radiated. One device for producing such short base-band pulses is disclosed by G. F. Ross in the U.S. Pat. No. 3,402,370 for a "Pulse Generator," issued Nov. 30, 1965.

While prior art transmitters are not normally used to produce truly short base-band or subnanosecond pulses, mere adjustment of parametric relations may permit such a result substantially to be obtained. Further, the performance of such transmitters in efficiently launching actual base-band pulses into space may be greatly improved by the use of the general kind of radiating antenna system employed by G. F. Ross and D. Lamensdorf in the U.S. Pat. application Ser. No. 46,079, for a "Balanced Radiation System," filed June 15, 1970, issued Apr. 25, 1972 as U.S. Pat. No. 3,659,203 and assigned to the Sperry Rand Corporation. The latter device, for instance, employs an electrically smooth, constant impedance, transmission line system for propagating TEM mode electromagnetic waves. The transmission line system is employed for the cooperative cyclic storage of energy on the transmission line and for its cyclic release by propagation along the transmission line and radiation at the end of a section of the transmission line formed as a directive antenna. Discharge of the line may be accomplished, for instance, by a conventional mechanically resonant mercury switch having an operating frequency adapted for performing switching at a 200 cycles per second rate. Thus, cooperative use is made of the transmission line system for signal generation by charging the transmission line at a first rate and also for signal radiation into space by discharging the line in a time much shorter than required for charging. Discharge of the transmission line causes a voltage wave to travel toward the radiating aperture of the antenna structure. The process operates to produce, by differentiation, a sharp base-band impulse of subnanosecond duration that is radiated into space. The antenna system 5 has a wide instantaneous band width, so that it may radiate such very sharp impulse-like signals with low distortion. Further, antenna 5 has an energy focusing characteristic such that energy radiated in a predetermined direction is maximized, as is desirable in object detection systems.

The radiated base-band signal propagates in free space toward a reflecting target such as the rear of car 2 and is reflected by the target surface to return toward receiver antenna 6. The wave returned may have been modified in the usual manner according to the particular nature of the reflecting object or target 2 so that it may have a somewhat time extended appearance. The echo wave is delayed with respect to the transmitted wave by a time which is proportional to twice the distance or range to the reflecting target 2. The receiver antenna 6 may have properties generally similar to those of the transmitter antenna 5 in that it employs a similar electrically smooth, constant impedance transmission line system for propagating TEM mode electromagnetic waves, as will be explained in connection with FIG. 10, so that collected echo signals of very short duration propagate into the receiver antenna with substantially no distortion. It will be understood that the transmission lines 12 and 13 connected to the antenna elements thus far presented are selected for their ability to propagate base-band signals with substantially no distortion. While dual parallel conductor lines or coaxial transmission lines are preferably employed, any selected energy transmission medium should be devoid of impedance discontinuities and so constructed and arranged as to support TEM mode propagation of the high frequency energy, since it is the TEM transmission line mode that is the substantially non-dispersive mode.

Any echo signal appearing on receiver antenna transmission line 13 is connected by matched tee junction 14 substantially equally to a first or far-gated detector channel 20 and to a second or near-gated detector channel 21. Considering far-gated detector channel 20, transmission line 30, stemming from matched tee 14, supplies any such echo signal to far-gated detector 31. Since transmission line 30 is also of the type adapted to propagate signals in the TEM mode, such signals arrive at far-gated detector 31 with no substantial degree of distortion. Signals passed by far-gated detector 31 are those falling within a first particular time era, as will be described, and produce within circuit 31 somewhat amplified, time-duration-extended output pulses for coupling to input 35a of AND circuit 35. The gate time duration is determined by far-gate generator 32, whose operation is synchronized by time reference pulses supplied by transmitter synchronizer 11 via leads 36 and 37 to far-gate generator 32. Control circuit 34 is connected to the output of far-gated detector 31 for the purpose of inhibiting the passage of succeeding target echoes through detector 31 by supplying an inhibit signal under such circumstances to inhibit circuit 33 connected between far-gate generator 32 and far gated detector 31. If required, an amplifier (not shown) may be connected between delay circuit 34 and inhibit circuit 33.

The same echo signals are supplied by matched tee junction 14 and transmission lines 13 and 30a to the second or near-gated detector channel 21, transmission line 30a also being adapted to propagate TEM mode signals with no substantial distortion into near-gated detector 31a. Signals passing through near-gated detector 31a are those falling within a second particular time era, as will be explained, and produce within circuit 31a somewhat amplified, time-duration-extended output pulses for coupling to input 35b of AND circuit 35. The gate time duration is determined by near-gate generator 32a, whose operation is synchronized by time reference pulses supplied by transmitter synchronizer 11 via leads 36 and 37a to near-gate generator 32a. Operation of near-gated detector 31a is not inhibited.

Accordingly, it is seen that respective near- and far-gated signals are supplied to inputs 35a and 35b of AND circuit 35. AND circuit 35 is of the conventional type which requires the presence of a third input signal on lead 35c before AND gate 35 produces an output on lead 46. The signal appearing at input 35c arises in a speed sensor 40, as will be explained, which sensor is adapted to provide no output voltage for vehicle absolute speed less than an arbitrary value and to produce an arbitrary fixed output voltage for all absolute forward speeds above that arbitrary value. The three inputs to AND gate 35 preferably have substantially equal amplitudes. In the simultaneous presence of such signals at inputs 35a, 35b, and 35c, AND circuit 35 generates an output on lead 46, causing actuator 45 to operate and to control a conventional protective or other damage or injury reducing device yet to be discussed. As will be seen, actuator 45 may be of the type adapted for providing the remedial function, for example, by either mechanical or by electrical actuator means. It will be understood by those skilled in the art that the novel detector system may be located on the rear of a protected vehicle as well as on the front, or in other locations.

Figure 2A:
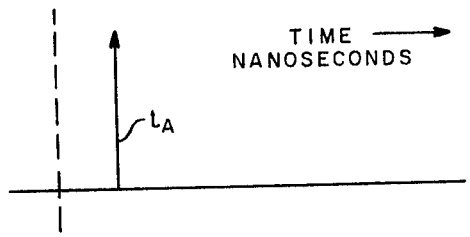
FIGS. 2 to 6 are graphs of wave forms useful in explaining the operation of the embodiment of FIG. 1.
Figure 2B:
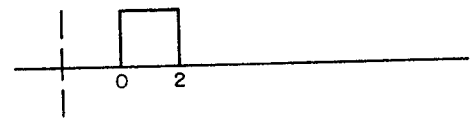

Referring to FIGS. 1 and 2a through 2g, the wave of FIG. 2a represents a typical base-band pulse transmitted at time $t_A$ from antenna 5 along a path such as path 5a. For any corresponding echo signal received by antenna 6 along a path such as path 6a, the respective receiver channels 20 and 21 appear to have range sensitivities as shown in FIGS. 2b, 2c, 5, and 6. The far-gated detector channel 20 has a sensitive time window or range gate width of eight nanoseconds (the wave of FIG. 2c) beginning at time $t_A$. This corresponds, in FIG. 5, to the fact that the receiver channel 20 preferably appears to be very sensitive to reflecting objects over the range of 2 to 6 feet forward of the object detector. Channel 20 is preferably very insensitive for reflecting objects from 0 to 2 feet and beyond six feet from the object detector.

Figure 6:
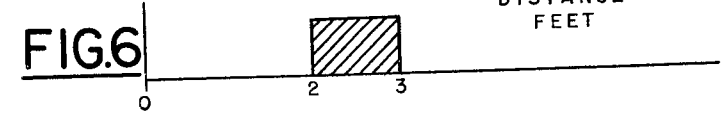

On the other hand, the near-gated detector 21 has a sensitive time window or range gate width of two nanoseconds (the wave of FIG. 2b) beginning at time $t_A$. This corresponds, as seen in FIG. 6, to the receiver channel 21 being very sensitive to reflecting objects over the range of 2 to 3 feet forward of the object detector. Channel 21 is accordingly very insensitive to reflecting objects from zero to 2 feet and beyond 3 feet from the object detector. It is seen that each successive transmitted pulse $t_A$ produces companion near and far gates as respectively shown in FIGS. 2b and 2c. Insensitivity for the 0 to 2 foot range is preferred for duplexing purposes and permits direct leakage of energy from the transmitter to the receiver to drop to an acceptable value.

Assume that the separation between cars 1 and 2 is decreasing at an arbitrary rate. A first transmitted baseband pulse $t_A$ may produce a corresponding echo $t_D$ as seen in FIG. 2d; it is clearly outside of both its associated near and far gates of FIGS. 2b and 2c. As the car 1 with the object detector continues to move toward car 2, the latter produces a second echo $t_E$ which also perhaps does not fall within its associated range gates of FIGS. 2b or 2c.

Figure 2C:
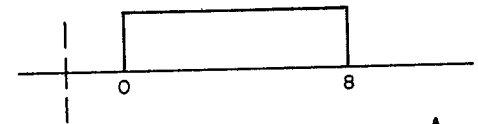
Figure 2D:
Figure 2E:
Figure 2F:
Figure 2G:
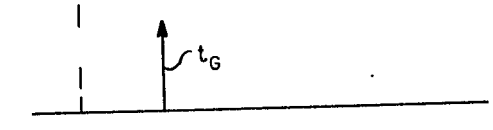
Figure 3:
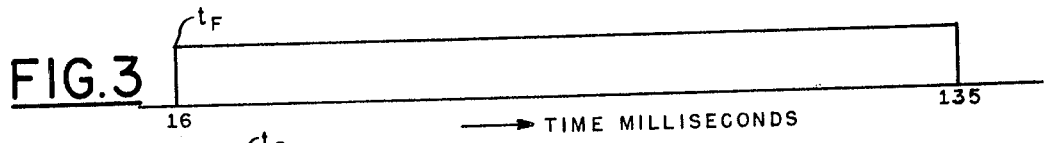

Ultimately, if the relative speeds of cars 1 and 2 are held, a subsequent transmitted pulse $t_A$ will produce an echo $t_F$ at receiver antenna 6 that overlaps its associated far range gate of FIG. 2c. At that instant of time $t_F$, far-gated detector 31 is, by definition, conductive and pulse $t_F$ produces, as will be explained, an amplified-time extended output from far-gated detector 31. The extended pulse wave thus generated is seen in FIG. 3 and extends from 16 to 135 milliseconds for reasons yet to be explained.

Figure 4:
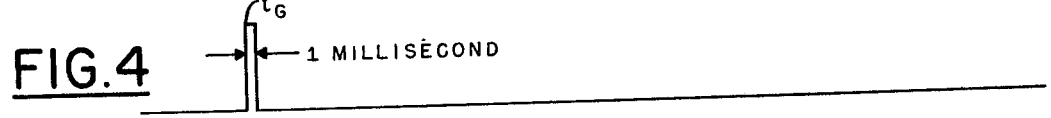

If car 1 continues to move so as to reduce the distance between cars 1 and 2, a subsequently transmitted pulse $t_A$ will fall after reflection within a corresponding subsequently generated near range gate in traversing near-range channel 21, causing near-gated detector 31a to emit a one millisecond pulse (FIG. 4) falling within the time presence of the wave of FIG. 3. The enabling waves of FIGS. 3 and 4 are respectively applied to the inputs 35a and 35b of AND circuit 35. If speed sensor 40 is providing a finite voltage representing a finite absolute vehicle forward speed to input 35c of AND circuit 35, actuator 45 is operated. It is seen that several pulses $t_A$ may be transmitted after the echo $t_F$ is received before a subsequent echo $t_G$ is received to form the 1 millisecond gate of FIG. 4, so that the latter gate may cause an actual coincidence output from AND circuit 35 over the range of 16 to 135 milliseconds of the wave of FIG. 3.

Figure 5:
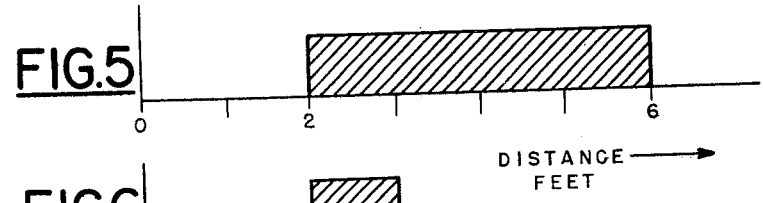

It is therefore seen that, if the 1 millisecond gate of FIG. 4 and the 119 millisecond gate of FIG. 5 are in time coincidence and that if the absolute forward speed of car 1 is above a predetermined value, actuator 45 is operated, causing a protective device such as an inflatable gas bag for protection or restraint of passengers within car 1 to be expanded. If car 1 is moving forward at an absolute rate below the aforementioned predetermined value, there is no input on lead 35c to AND circuit 35, and actuator 45 cannot operate; such action permits car 1 to be parked behind another vehicle, for instance, without exciting actuator 45. Further, if the relative speed between cars 1 and 2 is too low, the 1 millisecond pulse of FIG. 4 falls beyond the 135 millisecond end of the 119 millisecond gate, and the actuator 45 does not operate.

The 16 millisecond limit corresponds, for example, to a relative speed between cars 1 and 2 of 135 miles per hour; beyond this high relative speed, it may be considered that any accident is totally destructive and operation of a protective or restraint device, such as a conventional gas bag, would have little effect. The lower limit of 16 milliseconds and the upper limit of 135 milliseconds are readily subject to adjustment to conform to Government standards, as will be seen, by simple circuit adjustment. It will further be understood that all parametric values mentioned above in connection with wave form timing and duration may be adjusted over considerable ranges according to prevailing traffic patterns or regulations, and that the specific numbers mentioned are selected purely for illustrative purposes and are not intended to be interpreted in a limiting sense. It is seen that operation of actuator 45 is determined according to its inherent time reaction characteristics so that it is operated sufficiently prior to collision to perform its function adequately.

Far- and near-gated detector circuits 31 and 31a are adapted to gate subnanosecond or very short duration electromagnetic pulses received respectively on TEM mode transmission lines 30 and 30a under control of the respective far- and near-gate generators 32 and 32a. Operation of these elements in gating channels 20 and 21 is similar, and attention will, as a matter of convenience, therefore be turned first to describing the near-gate generator 32a and the near-gated detector 31a of channel 21. It will be recognized that the gating system is of the type disclosed and claimed by G. F. Ross in the U.S. Pat. application Ser. No. 137,355 for an "Energy Amplifying Selector Gate for Base-Band Signals," filed Apr. 26, 1971 and assigned to the Sperry Rand Corporation.

For controlling the operation of the near-gated detector 31a of FIGS. 1, 7, and 8, the synchronizer pulse 36A occurring at time $t_A$ in FIG. 2a is coupled by line 37a to a variable delay trigger circuit 56 for the purpose of generating an output line 61 a corresponding pulse 61B. Pulse 61B may be generally similar in characteristics to pulse 36A though delayed by a predetermined time interval. Variable delay trigger circuit 56 may be any of several well known adjustable pulse delay circuits, including those, for instance, whose delay characteristic may be varied or set according to the adjustment of a tap 58 movable along potentiometer 57 relative to lead 59, an appropriate potential being supplied to the opposite end of potentiometer 57 from a voltage source (not shown) connected to terminal 60 and which voltage source may also be grounded at its opposite end.

Variable delay trigger circuit 56 serves to determine the initiation of the near wave selector gate, while near range gate generator 62, whose input is supplied via line 61, determines the duration of the near wave selector gate. This duration is determined, as will be further explained in connection with FIG. 8, according to the length L of transmission line 63, whose center conductor is adapted to supply an operating voltage via resistor 64 from terminal 65 to the active circuit elements of near range gate generator 62. The near range gate thus formed is the wave 66C.

Wave 66C is supplied by line 66 to low pass filter 67, whose function is to provide a moderate integration to wave 66C, removing any transients or over-shoots from the edges of wave 66C and thus preventing false operation of succeeding circuits. Wave 68D is the modified output of filter 67, which output may be provided as a positive going wave to utilization apparatus (not shown) in certain gating circuit applications via terminal 68. In the present application, wave 68D is passed through inverter 69 to produce on line 70 the inverted or negative going wave 70E. Wave 70E is generally similar to wave 68D, but is inverted in polarity.

The inverted wave 70E is used to operate near-gated receiver-detector circuit 31a and gating circuit 71 which forms, as will be explained, the actual near-gating potential used to control flow of signals through the near-gated receiver-detector 31a from transmission line 30a to output leads 48a (wave 75F). Near-gated detector 31a is normally desensitized; when a near-gating signal is present at the output 70 of inverter 69, the near-gated detector 31a is made sensitive to the presence of, for instance, 100 millivolt signals appearing on dispersionless transmission line 30a and propagated into gated detector 31a. Such sensitivity produces an amplified selected or near-gated output wave 75F on lead 48a of the order of 3 volts. Such a signal on lead 48a is adequate to operate actuator 45 in the presence of other signals of appropriate amplitude on leads 35a and 35c of AND gate 35.

In FIG. 8, circuit details of the near-gating system are further illustrated, with elements which appear also in FIG. 7 bearing the same reference numerals as used in FIG. 7, including near-range gate generator 62, low pass filter 67, inverter 69, gating circuit 71, near-gated detector 31a, and transmission line 30a. The output line 61 of variable delay trigger circuit 56 supplies wave 61B via a coupling capacitor 100 and junction 102 to the base 104a of transistor 104, which transistor 104 may be of the 2N5130 type. Junction 102, and therefore base 104a, are coupled to ground through resistor 101. The collector 104b of transistor 104 is coupled via the inner conductor of coaxial transmission line 63 of length L through resistors 64 to a source (not shown) of positive potential connected between terminal 65 and ground. The length L of open-circuited delay line 63 is adjusted according to the desired duration of the sampling or near-gate wave 70E. The emitter 104c of transistor 104 provides an output connection via lead 66 to low pass filter 67. In a representative circuit, resistor 64 has the value of 47 K ohms, while the voltage on terminal 65 may be from +200 to +300 volts.

The emitter 104c of transistor 104 is coupled to junction 105 to provide an input to low pass filter 67, which filter 67 is of generally conventional nature and whose components include in series relation junction 105, resistor 107, junction 108, resistor 110, junction 111, resistor 113, resistor 114, junction 115, resistor 116, and a ground connection. Junction 105 is coupled to ground via resistor 106 and the respective junctions 108 and 111 are coupled to ground through low pass filter capacitors 109 and 112. Junction 115 serves as an output terminal for filter 67.

Junction 115 is coupled through the small coupling capacitor 147 to junction 118 of the inverter circuit 69 and thence to the base 149a of transistor 149, which may be of the 2N4258 kind. The emitter 149b of transistor 149 is coupled through a series circuit including junctions 128 and 124, resistor 120, and junction 123, to a source (not shown) of positive potential applied to terminal 121 and connected to ground at its opposite end. Junctions 123 and 128 are respectively coupled to ground via capacitors 122 and 130, while junction 124 is connected through potentiometer 125 and resistor 128 to ground. Capacitors 122 and 130 serve as radio frequency by-pass and decoupling components in the conventional manner. The tap 126 of potentiometer 125 is connected through resistor 127 to junction 118. The collector 149c of transistor 149 is connected as an output of the inverter 69 through diode 135. The resistance network associated with potentiometer 125 serves to adjust the potential across resistor 137 which determines the steady state hold off bias on the detector.

Diode 135 is connected by line 70 to junction 136 through resistor 137 to ground and via line 138 to the emitter 74c of near-gated detector transistor 74, which may be of the 2N5130 type. Transistor 74 serves as the primary active element of near-gated detector 31a of FIG. 7. The collector 74b of transistor 74 is connected through junction 141 to the gate electrode 143a of field effect transistor 143, which latter may be of the 2N4274 type. The drain electrode 143b of transistor 143 is connected to a source (not shown) of positive potential applied at terminal 148 which may be of the order of +75 to +100 volts with respect to its grounded terminal. The source electrode 143c of transistor 143 is coupled via resistor 142 to junction 141 and also via coupling condenser 145 to the final output 48 consisting of output leads 147 and 147a connected across load resistor 146.

Base-band or subnanosecond echo signals to be near-gated are applied by line 30a to the base 74a of detector transistor 74. Such base band signals may be found across the matching load resistor 140 attached across a conventional non-dispersive TEM mode transmission line such as a continuous two-wire line comprising constant impedance or uniformly spaced parallel conductors 30a, 30a'.

Operation of the wave amplifying selector of near-gate circuit will be understood from the foregoing. It is seen that range gate generator 62 relies for its operation upon characteristics inherent in the 2N5130 avalanche transistor 104 and in the open circuited delay line 63 of length L. In response to the positive triggering signal 61B, transistor 104 breaks into conduction and a voltage step wave is propagated into delay line 63. When this step wave reaches the open end of line 63, it is reflected there and returns to collector 104b, whereupon the current flow in transistor 104 is brought abruptly to zero and the transistor reverts to its non-conducting condition. Thus, the voltage wave 66C across filter resistor 106 is a sharply rising and terminating positive pulse of duration 2L/c seconds, a duration dictated by the length L of delay line 63 (c is the velocity of propagation of the step wave in delay line 63).

In the quiescent state of the circuit of FIG. 8, transistor 149 in inverter circuit 69 is normally fully conducting, causing a current of about 30 milliamperes to flow through the emitter resistor 137 associated with near-gated detector transistor 74 (resistor 137 may have a resistance value of about 100 ohms). The voltage consequently appearing across resistor 137 will be about +3 volts and assures that detector transistor 74 is in its non-conducting state. The field effect transistor 143 acts as a constant current source, assuring that a constant current is fed via the collector 74b and emitter 74c of detector transistor 74 in its quiescent or non-conducting state so that its bias state is precisely controlled. Resistor 142 in the collector circuit of detector transistor 74 has a positive thermal coefficient and to afford temperature compensation for the thermal characteristic of the conduction threshold of detector transistor 74.

When wave 61B triggers range gate generator 62, the positive output wave 66C produced by near-range gate generator 62 is, as previously explained, fed through low pass filter 67 to inverter 69. In traversing filter 67 wave 66C is acted upon so that the positive wave 68D results, having rounded rise and fall portions. Accordingly, any high level transients near the start or the end of wave 66C are removed, a desirable result since they might otherwise undesirably trigger detector transistor 74 into conduction.

The positive wave 68D, when coupled by capacitor 147 to inverter circuit 69 and thus to the base 149a of transistor 149, causes current conduction through transistor 149 to stop, forcing the voltage across resistor 137 rapidly to fall to zero. This event places detector transistor 74 in its fully sensitive state with respect to any signal to be sampled that is propagated to it along dispersionless transmission line 30a, for example, and thereby arriving at the base 74a of transistor 74. Any signal sampled or near-gated by detector transistor 74 appears as a negative amplified and time extended wave 75F on the collector 74b of detector transistor 74 and is supplied by coupling condenser 145 across load resistor 146, for example. It may then be supplied to AND gate 35 or other utilization apparatus via terminals 147 and 147a in the customary manner, since wave 75F is amplified and time extended with respect to the received and near-gated short pulse or echo signal. Upon termination of the near-gating pulse 68D, the circuit returns to its above described quiescent state, awaiting receipt of the next succeeding triggering wave 61B.

It will be noted that transmission of short-duration pulses from their source, such as from base-band pulse generator 10 of FIG. 1, is through a transmission medium that preferably operates substantially solely in the TEM mode, and that propagation modes that permit dispersion of pulses such as subnanosecond or base-band pulses are not used. Thus, the full energy of any received echo or other base-band pulses originally generated by transmitter 10 is effectively directed to processing within the amplifying near-gated detector 31a. It is seen that the invention utilizes sampling or gating means having gain for the precise short duration sampling of electromagnetic waves wherein the sampling time and sampling duration depend upon reliably stable elements, and that the sampling system employs stable, balanced, non-dispersive transmission line elements for preventing distortion of the signals to be sampled.

Figure 9:
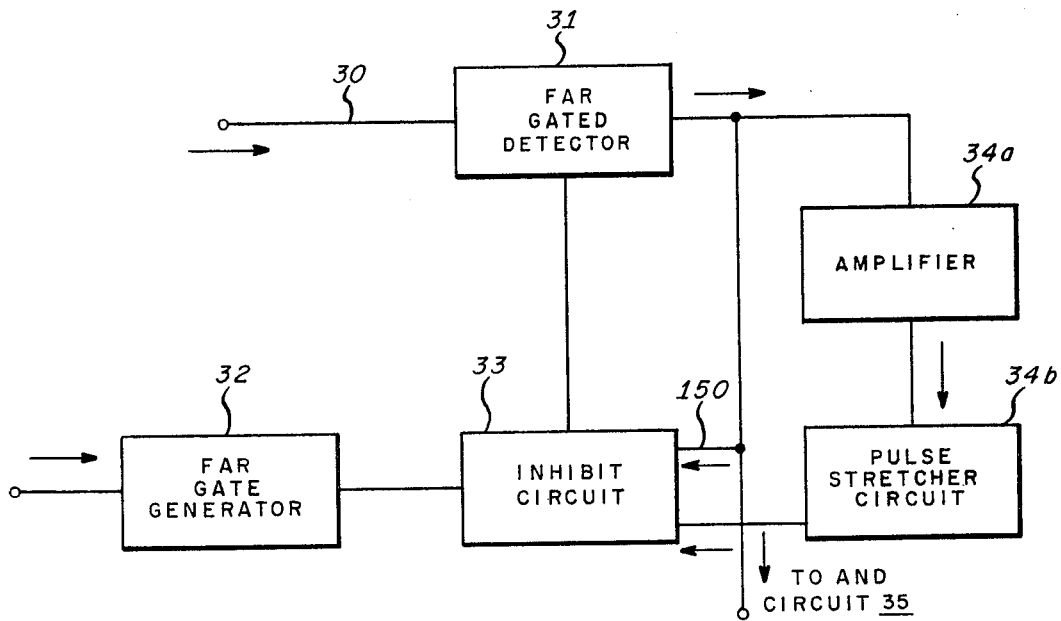
FIG. 9 is a block diagram of an alternative form of a portion of FIG. 1.

It will readily be understood that the near-gate generator 32a and the near-gated detector 31a of near-gating channel 21 have similar counterpart components in far-gating channel 20 in the form of far-gate generator 32 and far-gated detector 31. Except for timing and time duration adjustments according to the needs recited in connection with FIG. 1, similar circuits are used in gating channels 20 and 21, though channel 20 also includes the aforementioned inhibit circuit means 33 for inhibiting flow of certain signals from far-gate generator 32 to far-gated detector 31. When far-gated detector 31 is activated by an echo signal fed to it on transmission line 30, the far-gate detector output is the extended wave of FIG. 3. It is not desired that any immediately succeeding echo similarly interact with far-gate detector 31 prior to the end at 135 milliseconds of the wave of FIG. 3. It is desired that such operation be negated to prevent the appearance of a problem analogous to the cyclic range ambiguity problem found in conventional high repetition rate object locators. Accordingly, when the wave of FIG. 3 appears on conductor 48, it is coupled to control circuit 34. Control circuit 34 may comprise conventional elements such as shown in FIG. 9, wherein the far-gated detector 31, the far-gate generator 32, and inhibit circuit 33 are again illustrated. The wave of FIG. 3 may be coupled directly by lead 150 at once to inhibit signal passage through inhibit gate 33. Preferably, inhibit circuit 33 is caused to remain in its inhibiting state for a longer period, on the order of one half of one second, by pulse stretcher circuit 34b which, along with amplifier 34a, makes up control circuit 34 of FIG. 1. Pulse stretcher 34b may be any conventional pulse stretching circuit of the type adapted to form a pulse of suitable duration from the wave of FIG. 3 after amplification, if required. Various known circuits are useful for this purpose, as are electromechanical devices such as thermal relays.

Figure 15:
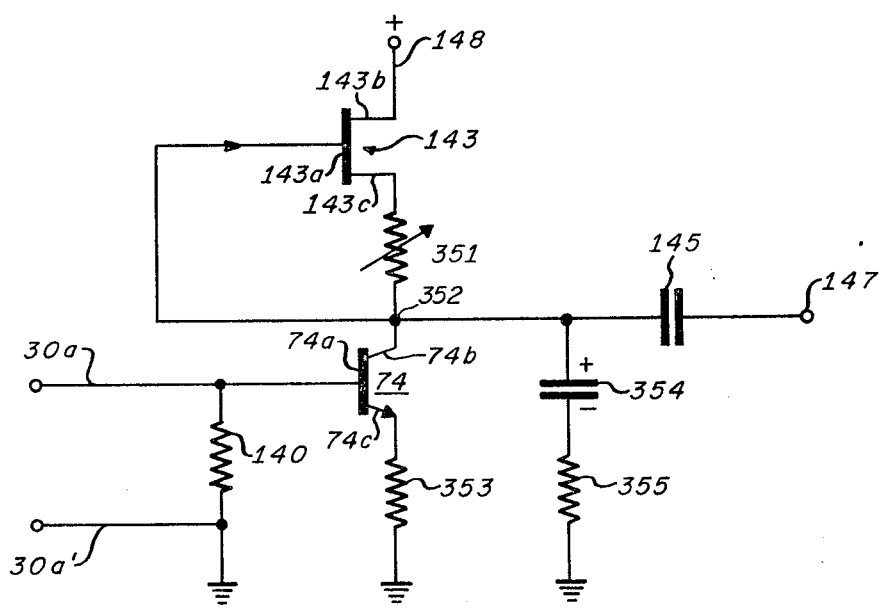
FIG. 15 is a circuit diagram of an alternative form of the circuit of FIG. 8.

Referring to FIG. 1, the effect of the far-gate generator 32 is shown to be inhibited by inhibit circuit 33 so that far-gated detector 31 does not respond to echo signals following immediately after an echo is actually gated by detector 31 to form an output on line 48. As illustrated in FIG. 15, it is also possible to perform the function of far-gated detector 31 by substituting a detector circuit adapted to be self-inhibiting for a significant predetermined period of time after an echo has been processed by it.

In FIG. 15, transistor 74, which may again be of the 2N5130 type, serves as the primary active element of the detector. The collector 74b of transistor 74 is connected through junction 352 and resistor 351 to the gate electrode 143c of field effect transistor 143, which latter may be of the 2N4274 kind. The emitter 74c of transistor 74 is coupled through resistor 353 to ground, while the base 74a of transistor 74 is supplied with base band signals appearing on transmission line 30a, 30a' as in FIG. 8 and therefore across matching load resistor 140.

The drain electrode 143b of field effect transistor 143 is connected to a source (not shown) of positive potential applied at terminal 148 which may be on the order of +100 volts with respect to the grounded terminal of the source. The source electrode 143c and junction 352 are coupled to the third electrode 143a of field effect transistor 143. Junction 352 is coupled through coupling capacitor 145 to the useful gated voltage output terminal 147; junction 352 is coupled also through capacitor 354 and current limiting resistor 355 to ground. For providing an inhibition period of 200 milliseconds, for example, condenser 354 may be an electrolytic condenser having a capacitance of the order of 12 microfarads.

In operation, field effect transistor 143 again acts as a constant current source with resistor 351 adjusted so as to provide a proper bias signal. Considering condenser 354 to be in its charged state, the collector to ground voltage for transistor 74 will attain a voltage level such that detector transistor 74 conducts upon receipt of a base band signal on transmission line 30a, 30a', discharging condenser 354 and supplying a useful output at terminal 147, as in the case of the FIG. 8 circuit. Because the collector to ground voltage drops, transistor 74 can not again fire until condenser 354 is charged to the required level. With the recovery time of the circuit established at several hundred milliseconds, the far gate is inhibited from excitation by incoming echoes until circuit recovery is attained.

The gating channels 20 and 21 of FIG. 1 are adapted to be fed echo signals by dispersionless transmission lines 30, 30a, and 13, the latter being coupled to antenna 6. The nature of the antenna and transmission line system will be understood by reference to FIGS. 1, 10, 11, and 12. The receiver antenna 6 and its associated transmission line 13 may take the form shown in FIG. 10, where antenna 6 comprises a structure having mirror image symmetry about a median plane at right angles to the direction of the vector of the electric field propagating into antenna 6. The same type of symmetry presides in the cooperating transmission line 13 which comprises parallel wire transmission line conductors 200 and 200a; conductors 200 and 200a are spaced wire conductors constructed of a material capable of conducting high frequency currents with substantially no ohmic loss. Furthermore, conductors 200 and 200a are so constructed and arranged as to support TEM mode propagation of high frequency energy, with the major portion of the electric field lying between conductors 200 and 200a.

The TEM receiver antenna 6 preferably consists of a paired of flared, flat, electrically conducting planar members 210 and 210a. Members 210 and 210a are, for example, generally triangular in shape, member 210 being bounded by flared edges 212 and 213 and a frontal aperture edge 214. Similarly, member 210a is bounded by flaring edges 212a and 213a and a frontal aperture edge 214a. Frontal aperture edges 214 and 214a may be straight or arcuate. Each of triangular members 210 and 210a is slightly truncated at its apex, the truncations 219 and 219a being so constructed and arranged that conductor 200 is smoothly joined without overlap at truncation 219 to antenna 210. Likewise, conductor 200a is smoothly joined without overlap at truncation 219a to antenna member 210a. It is to be understood that the respective junctions at truncations 219 and 219a are formed using available techniques for minimizing impedance discontinuities corresponding to the junctions.

Figure 12:
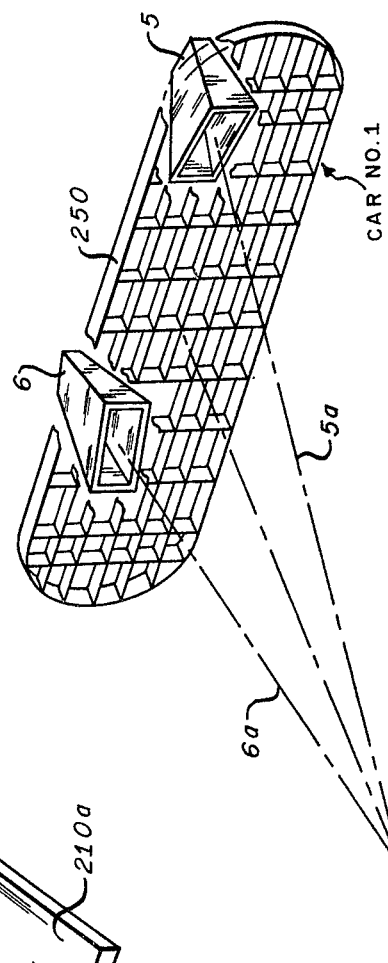
FIG. 12 is a perspective view illustrating the general location of the antennas of FIG. 1 in a representative vehicle.

It is also to be understood that the flared members 210 and 210a of antenna 6 are constructed of material highly conductive for high frequency currents. It is further apparent that the interior volume of antenna 6 may be filled with an air foamed dielectric material exhibiting low dielectric loss in the presence of high frequency fields, such material acting to support conductor 210 in fixed relation to conductor 210a. Alternatively, the conductive elements of antenna 6 may be fixed in spaced relation by dielectric spacers (not shown in FIG. 10) which cooperate in forming enclosing walls for the configuration as indicated in FIG. 12, thereby protecting the interior conducting surfaces of antenna 6 from the effects of precipitation and corrosion.

The planar collector elements 210 and 210a of receiver antenna 6 are coupled in impedance matched relation to the two wire transmission line 13. Transmission line 13 is arranged to have the same impedance as the transmission line comprising antenna elements 210 and 210a. Transmission line 6 may have its parallel wire conductors 200 and 200a molded into a dielectric enclosing elements 221 for the purpose of accurately determining the separation of conductors 200 and 200a so that transmission line 6 has a constant impedance along its length. Dielectric element 221 may be surrounded, in turn, by a braided or other conductive shield 222 which may be grounded at any convenient location. Shield 222 may, in turn, be surrounded by a protective plastic cover element 223 of the well known type.

Figure 11:
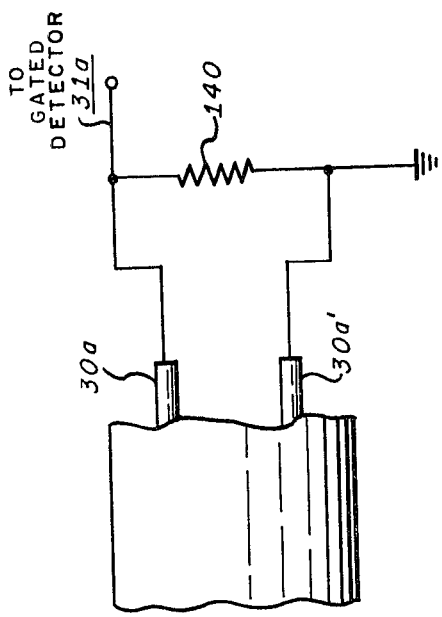
FIG. 11 is a view, partly in cross section, of a transmission line used in FIG. 1.
Figure 10:
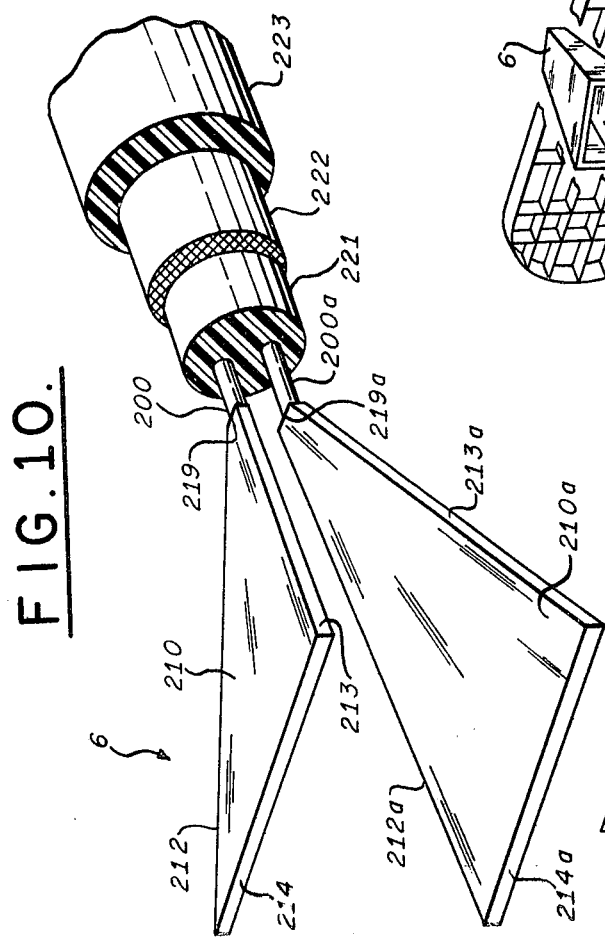
FIG. 10 is a perspective view, partly in cross section, of the receiver antenna of FIG. 1.

As indicated in FIG. 11, the transmission lines 30, 30a which branch from matched tee junction 14 in FIG. 1 and which respectively feed echo signals to far-gated detector 31 and to near-gated detector 31a are preferably of construction similar to the dispersionless dual conductor transmission line 13 to FIG. 10. Transmission line 30 is thus readily coupled to the base of a detector transistor like transistor 74 within far-gated detector 31. Likewise, transmission line 30a is readily coupled to the base of a detector transistor 74 within the near-gated detector 31a.

The cooperating antenna 6 and transmission line system of the form shown in FIGS. 10 and 11 is a preferred receiver antenna system, in part, because desired TEM mode propagation therein is readily established. The TEM propagation mode is preferred, since it is the substantially non-dispersive propagation mode and its use therefore minimizes distortion of the propagating subnanosecond pulse signal to be received by antenna 6. The simple dual conductor transmission line structure also permits construction of the antenna-transmission line configuration with minimum impedance discontinuities. The characteristic impedance of antenna 6 is constant along its length and may thus be readily made equal to that of transmission line 13. By maintaining a continuously constant characteristic impedance and TEM propagation along the structure including antenna 6 and transmission lines 13, 30, 30a, frequency sensitive reflections are prevented therein and frequency dispersion is eliminated. A received subnanosecond impulse therefore flows through antenna 6 into transmission lines 13 and 30 and 30a without substantial reflection and without substantial degradation of its shape or amplitude. Since the full energy or amplitude of a low-level subnanosecond base-band pulse is thus delivered to the far- and near-gated receiver detectors 31 and 31a by the antenna-transmission line system, it is seen that the receiver detectors can be sensitive to extremely short low-level base-band pulses having an extremely wide spectral content, any component of which would be incapable of detection using conventional wide pulse reception techniques. Antenna 6, along with transmitter antenna 5, will generally be mounted with respect to a protected vehicle as indicated in FIGS. 1 and 12. In FIG. 12, a representative installation is shown wherein antennas 5 and 6 are located just behind a dielectric or other substantially open grill 250 at the front of the protected vehicle. Other frontal or other locations will readily be found to be suitable.

Figure 13:
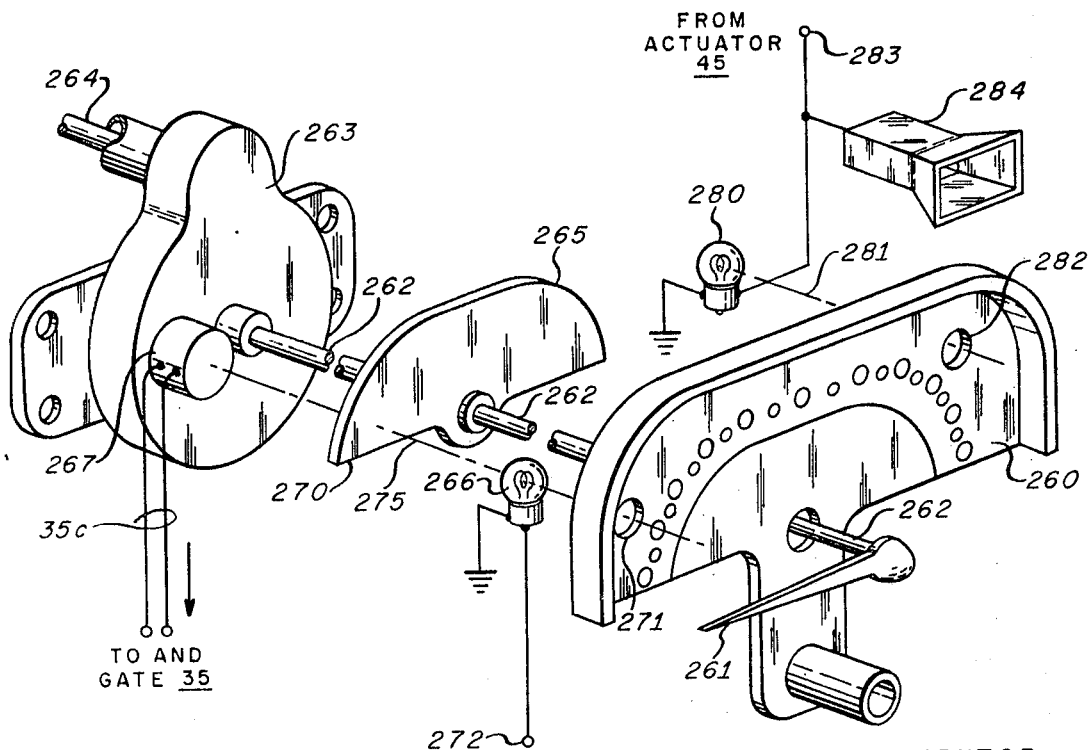
FIG. 13 is an exploded partial view of a signal source employed in the system of FIG. 1.

In order for actuator 45 to operate as previously described, a signal related to the absolute speed of car 1 and of appropriate level must be applied to input 35c of AND gate 35 in FIG. 1. Speed sensor 40 may take any of several forms of known devices capable of providing a zero output below a predetermined absolute vehicle speed and a finite output above that predetermined absolute speed. In the example shown in FIG. 13, the speed sensor 40 cooperates with a conventional vehicle speedometer having a calibrated dial 260 with a pointer 261 mounted on an end of a spindle 262. It will be understood that the speedometer includes within casing 263 the usual driving permanent magnet and torqued speed cup and that spindle 262 is affixed to the speed cup for rotation thereby. It will further be understood that the speedometer drive cable 264 is geared to the drive shaft of the vehicle in the conventional manner such as to rotate the permanent magnet within casing 263 and thus induce a clockwise rotation of spindle 262 and pointer 261 to a position indicative of vehicle speed, the rotation of the speed cup and of spindle 262 being against the action of a spring within casing 263 which tends to return pointer 261 to its zero position.

A cam-shaped half disc 265 is secured to spindle 262 between casing 263 and dial 260 for rotation with spindle 262. The periphery of cam 265 passes between light source 266 and photocell 267, cutting optical path 275. Cam 265 is located on spindle 262 so that the edge 270 of the cam moves with pointer 261 in substantially the same angular relation as pointer 261. Light source 266 may be supplied with power from the vehicle battery (not shown) via terminal 272 when the object detector itself is activated, as by operating the engine ignition switch, and may be viewed by the vehicle operator through aperture 271 in dial 260. The output of photocell 267 may be applied directly or after suitable amplification to the input 35c of AND gate 35. From FIG. 13, it is seen that for low vehicle forward speeds, cam 265 intercepts the optical path 275 between light source 266 and photocell 267, and there is no signal input at terminal 35c of AND gate 35. On the other hand, as pointer 261 progresses above a predetermined absolute speed indication, such as a very few miles per hour, the edge 270 of cam 265 moves with it out of optical path 275 and photocell 267 then supplies a signal of arbitrary amplitude to AND gate 35. It will be understood that there are other types of signal sources for generating the desired absolute speed term; for example, cam 265 can readily be employed as an element of a capacity pick-off bridge circuit designed to produce oscillations and to provide a finite rectified signal to AND gate 35 above the predetermined forward speed and to fail to oscillate, thus yielding no output, below the same predetermined forward speed.

The output of actuator 45 appearing at terminal 283 in FIG. 1 may be beneficially employed in various ways; it may be used to provide a visual or audible warning of the impending collision event or may be used to actuate conventional protective devices, such as inflatable gas bag devices, for reducing the possibility of injury to a passenger whose body would otherwise strike the dashboard of the vehicle. For example, in FIG. 13, the output at terminal 283 may be applied to operate a lamp 280 whose optical path 281 projects through an aperture 282 in the speedometer dial 260 and whose illumination may therefore be viewed by occupants of the vehicle. Preferably, a horn 284 having a strident tone is actuated by the output of actuator 284 for the same purpose.

Figure 14:
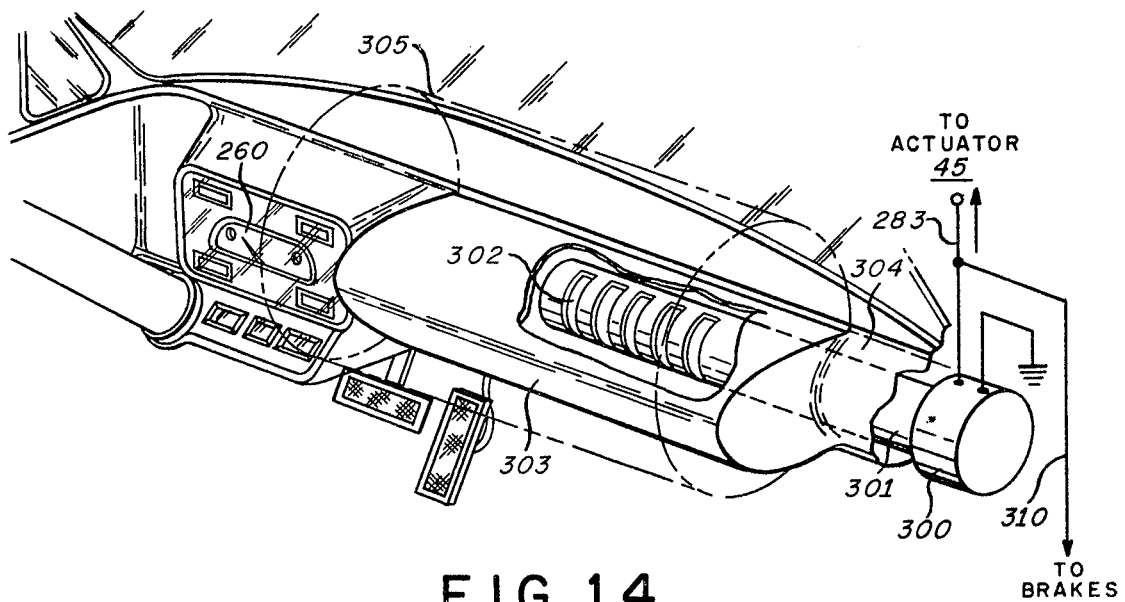
FIG. 14 is a perspective view, partly in cross section, of a passenger restraint system which may be employed with the apparatus of FIG. 1.

Various protective devices may similarly be operated by actuator 283, such as the gas bag restraint device of FIG. 14. This conventional safety apparatus comprises, in general, a container or reservoir 300 of a gas producing medium and a pipe 301 with a plurality of gas diffusing slots such as slot 302. The container 300 contains a conventional actuating mechanism for controlling release of gas from the medium within container 300 so that it flows through diffuser slots 302 into the gas bag 303, causing the latter to expand.

The release of gas may be brought about by the signal applied to terminal 283 causing a detonator (not shown) to explode an explosive substance within container 300. The gas produced by the explosion forces its way out of container 300 into pipe 301 and through slots 302. Alternatively, the presence of a signal on terminal 283 may be used to cause a valve within container 300 to release gas from a high pressure storage vessel. Other arrangements are known to those skilled in the art, including those in which deflation of the gas bag after a crash can be accomplished by the manual operation of a suitable valve or by automatic time delayed release of the gas.

Flow of gas from diffuser slots 302 causes inflation of gas bag 303. The inflatable bag 303 is normally in a dormant collapsed or folded condition as shown at 303 in FIG. 14, and may be aesthetically contoured so as to give the general appearance of a continuation of the vehicle dash-board 304. The inflatable bag 303 is secured in sealed relation about the diffuser pipe 301, and is therefore inflated to the position indicated by the dash-dot lines 305 upon release of gas from container 300. In the event of a collision, the gas bag 303 is expanded rapidly, forming a cushion between occupants facing the vehicle dash, and restraining the passengers so that they do not collide with the dash board or windscreen as the vehicle is rapidly decelerated. It will be understood by those skilled in the art that additional gas bags in other locations within the vehicle may be used to protect other passengers from hitting the sides, roof, or other parts of the vehicle interior. Furthermore, as suggested in FIG. 14, the output of actuator 45 appearing at terminal 283 may be supplied via electrical lead 310 to a suitable means such as a solenoid for actuating vehicle brakes, assuming that they have not already been applied by the vehicle driver. While automatic actuation of brakes will not necessarily diminish the actual chance of collision, at least some of the vehicle energy will be dissipated, reducing consequent probabilities of destruction of life and property.

It is seen that the novel collision sensor system receiver of FIG. 1 is a wide band or wide open detector device, a receiver which will respond to any signal level in excess of the bias level which might be dictated by the characteristic of a particular transistor gated detector 74. The amplitude of the received base-band pulse at the receiving antenna 6 may be, for example, about 200 millivolts in a typical operating circumstance, a value several orders of magnitude greater than the signals present in an urban environment due to conventional radiation sources, such interfering signals normally being at a microvolt level. Accordingly, although the collision sensor receiver of FIG. 1 essentially accepts all echo signals over a very wide pass band, it is substantially immune to interference from conventional radiation sources, including electrical noise signals.

The directive transmitter-antenna configuration 10, 5 shown in FIG. 1 may, for instance, transmit a regular train of extremely short duration, relatively low amplitude base-band pulses. In one typical situation, these impulse-like signals have time durations of substantially 200 picoseconds and a pulse repetition frequency of the order of 10 kilohertz. However, the upper bound on the average power transmitted into space may be less than one microwatt. The spectrum of the transmitted base-band signal is spread over an extremely wide band, typically 100 megahertz to 10 gigahertz. Accordingly, the power radiated in any typical narrow communication band is far below the thermal noise threshold of a typical conventional communication receiver operating in that band. The transmitted base-band pulse is therefore incapable of interfering with the operation of standard radio communication equipment, while being remarkably adapted for use with the novel vehicle safety apparatus of the present invention.

While the invention has been described in its preferred embodiments, it is to be understood that the words which have been used are words of description rather than of limitation and that changes within the purview of the appended claims may be made without departing from the true scope and spirit of the invention in its broader aspects.

I claim:

1. Vehicle safety apparatus comprising:
   transmitter means adapted to be carried by said vehicle for transmitting a first and a subsequent base-band signal toward a reflecting object,
   receiver means adapted to be carried by said vehicle and having transmission line means for receiving a first and a subsequent signal reflected by said object corresponding to said respective first and subsequent base-band signals,
   first circuit means responsive only to said first received signal and coupled to said transmission line means for producing a first output signal of substantially greater duration than said first transmitted signal,
   second circuit means responsive to said subsequent received signal and coupled to said transmission line means for producing a second output signal of substantially greater duration than said subsequent transmitted signal,
   sensor means for providing a third output signal representative of vehicle forward absolute speed above a predetermined finite value of said speed,
   third circuit means responsive to the simultaneous presence of said first, second, and third output signals for producing a fourth output signal, and
   safety means responsive to said fourth output signal.

2. Apparatus as described in claim 1 wherein said transmitter means includes means for transmitting, without distortion, a train of subnanosecond duration electromagnetic pulses each having a wide frequency range spectral line content, the energy in any selected one of said spectral lines being substantially below the ambient noise level.

3. Apparatus as described in claim 1 wherein said transmitter means comprises:
   substantially non-dispersive transmission line transmitter antenna means for propagating and radiating a train of electromagnetic pulses in the TEM transmission line mode, and
   synchronizer signal generator means for exciting said non-dispersive transmission line means.

4. Apparatus as described in claim 3 wherein said receiver means comprises substantially non-dispersive transmission line receiver antenna means for receiving and propagating a reflected electromagnetic pulse train in the TEM transmission line mode.

5. Vehicle safety apparatus comprising:
   transmitter means adapted to be carried by said vehicle for transmitting a first and a subsequent base-band signal toward a reflecting object, said transmitter means including:
      substantially non-dispersive transmission line transmitter antenna means for propagating and radiating a train of electromagnetic pulses in the TEM transmission line mode, and
      synchronizer signal generator means for exciting said non-dispersive transmission line means,
   receiver means adapted to be carried by said vehicle and having transmission line means for receiving a first and a subsequent signal reflected by said object corresponding to said respective first and subsequent base-band signals,
   first circuit means responsive to said first received signal and coupled to said transmission line means for producing a first output signal of substantially greater duration than said first transmitted signal, said first circuit means including:
      far-gate generator means responsive to said synchronizer signal generator means for producing a first gating signal, and
      far-gated detector means responsive to said first gating signal and to said first received signal for producing said first output signal,
   second circuit means responsive to said subsequent received signal and coupled to said transmission line means for producing a second output signal of substantially greater duration than said subsequent transmitted signal,
   sensor means for providing a third output signal representative of vehicle forward absolute speed above a predetermined finite value of said speed,
   third circuit means responsive to the simultaneous presence of said first, second, and third output signals for producing a fourth output signal, and
   safety means responsive to said fourth output signal.

6. Apparatus as described in claim 5 wherein said circuit second means comprises:
   near-gate generator means responsive to said synchronizer signal generator means for producing a second gating signal, and
   near-gated detector means responsive to said second gating signal and to said subsequent received signal for producing said second output signal.

7. Apparatus as described in claim 6 wherein:
said first and said second gating signals are initiated substantially at the same time by said synchronizer signal generator, and
said first gating signal is of substantially greater duration than said second gating signal.

8. Apparatus as described in claim 7 wherein inhibit means responsive to said first output signal is adapted to inhibit operation of said far-gated detector means by said far-gate generator means for a predetermined time following the initiation of said output signal.

9. Apparatus as described in claim 6 wherein said far-gated detector means comprises:
first transistor means having base, collector, and emitter means,
first means responsive to said receiver transmission line means for supplying said first received signal to said base means of said first transistor means substantially without distortion thereof,
first bias means connected to said collector means of said first transistor means for biasing said first transistor means near conduction,
first means connected to said emitter means of said first transistor means for causing said first transistor means to conduct in the presence of said first received signal, and
far-gated output means connected to said collector means of said first transistor means for supplying said far-gated output signal to said third circuit means.

10. Apparatus as described in claim 9 wherein said near-gated detector means comprises:
second transistor means having base, collector, and emitter means,
second means responsive to said receiver transmission line means for supplying said subsequently received signal to said base means of said second transistor means substantially without distortion thereof,
second bias means connected to said collector means of said second transistor means for biasing said second transistor means near conduction,
second means connected to said emitter means of said second transistor means for causing said second transistor means to conduct in the presence of said subsequently received signal, and
near-gated output means connected to said collector means of said second transistor means for supplying said near-gated output signal to said third circuit means.

11. Apparatus as described in claim 10 wherein said first and said second bias means comprise:
field effect transistor means having source, drain, and gate electrode means,
impedance means, and
voltage source means,
said voltage source means being connected to said drain electrode means,
said source electrode means being connected through said impedance means to said collector means, and
said gate electrode means being connected to said collector means.

12. Apparatus as described in claim 11 wherein said far-gate generator means and said near-gate generator means comprise:
synchronizer signal generator signal delay means, and
circuit means responsive to said signal delay means for forming said gating pulse of longer duration than said transmitted signal.

13. Apparatus as described in claim 1 wherein said sensor means comprises:
means for deriving a substantial measure of the absolute forward speed of said vehicle,
means for converting said measure into a substantially constant finite signal only above a predetermined value of said speed, and
means for supplying said converted signal to said third circuit means.

14. Apparatus as described in claim 13 including means incorporated in said sensor means for affording warning of an impending collision event.

15. Apparatus as described in claim 1 wherein said safety means comprises:
passenger protective means operative in response to said fourth output signal.

16. Apparatus as described in claim 15 wherein said safety means provides means responsive to said fourth output signal for restraining vehicle occupants from impacting interior parts of said vehicle.

17. Apparatus as described in claim 16 wherein said means for restraining vehicle occupants comprises an expandable occupant restraint means having a contracted state, container means for supplying gas, and means responsive to said fourth signal for causing gas flow from said container means to said expandable restraint means.

18. The combination of:
receiver means for receiving first and subsequent signals and adapted to be carried by a vehicle,
first circuit means responsive to said receiver means only in the presence of a first received signal representing an object located in an extended range first zone with respect to said receiver means for producing a first output signal,
second circuit means responsive to said receiver means in the presence of a subsequent received signal representing said object when located in a range zone less extended with respect to said receiver than said first zone for producing a second output signal,
speed sensor means for producing a third output signal above a predetermined finite vehicle speed, and
actuator means responsive to the simultaneous presence of said first, second, and third output signals.

19. Apparatus as described in claim 18 wherein said receiver means comprises substantially non-dispersive transmission line antenna means for receiving and propagating reflected pulse signals.

20. The combination of:
receiver means adapted to be carried by a vehicle,
first circuit means responsive to said receiver means in the presence of a first received signal representing an object located in an extended range first zone with respect to said receiver means for producing a first output signal,
inhibit means responsive to said first received signal adapted to inhibit operation of said first circuit means for a predetermined time following the initiation of said first output signal,
second circuit means responsive to said receiver means in the presence of a subsequent received signal representing said object when located in a range zone less extended with respect to said receiver than said first zone for producing a second output signal, speed sensor means for producing a third output signal above a predetermined finite vehicle speed, and actuator means responsive to the simultaneous presence of said first, second, and third output signals.

21. Apparatus as described in claim 20 further including passenger protective means responsive to said actuator means.

22. Apparatus as described in claim 20 further including transmitter means comprising:

substantially non-dispersive transmission line transmitter antenna means for radiating electromagnetic pulses, and synchronizer signal generator means for exciting said non-dispersive antenna means.

23. Apparatus as described in claim 22 wherein said first and second circuit means for synchronously made responsive to received signals in response to said synchronizer signal generator means.

* * * * *